United States Patent [19]

Gonin

[11] 4,137,941

[45] Feb. 6, 1979

[54] DISCHARGE VALVES

[75] Inventor: André Gonin, Saint Etienne, France

[73] Assignee: Centre Stephanois de Recherches Mecaniques Hydromecanique et Frottement, Loire, France

[21] Appl. No.: 727,306

[22] Filed: Sep. 27, 1976

[51] Int. Cl.² ............................................. F16K 31/12
[52] U.S. Cl. ..................................................... 137/508
[58] Field of Search ......................................... 137/508

[56] References Cited

U.S. PATENT DOCUMENTS

| | | | |
|---|---|---|---|
| 2,693,821 | 11/1954 | Cornelius | 137/508 |
| 2,906,289 | 9/1959 | Fox | 137/508 |
| 2,991,797 | 7/1961 | Baldwin | 137/508 X |
| 3,064,687 | 11/1962 | Natho | 137/508 X |
| 3,519,011 | 7/1970 | Pennanen | 137/508 X |

FOREIGN PATENT DOCUMENTS 600674 12/1959 Italy .......................................... 137/508

*Primary Examiner*—Harold W. Weakley
*Attorney, Agent, or Firm*—Remy J. VanOphem

[57] ABSTRACT

The invention is a fluid discharge valve wherein the force necessary to maintain the valve in a closed position in the absence of fluid pressure is kept at a very nominal pressure. The fluid discharge valve further provides for the force on the valve body to increase proportional to the pressure up to a pre-determined value. At this pre-determined value, means are provided to open the valve and thereby allow fluid to pass. The invention provides for a discharge valve which maintains its initial calibration, as well as avoids the valve body and valve member to be exposed to a high closing force in the absence of fluid pressure. Further, means are provided to allow for selecting the pre-determined value.

1 Claim, 6 Drawing Figures

DISCHARGE VALVES

BACKGROUND OF THE INVENTION

The present invention is concerned with a discharge valve of novel type for use in a hydraulic circuit.

Many types of discharge valves are known which are particularly used in mine props. Such a valve is adapted to establish a leakage in a fluid circuit where the fluid is compressed beyond a determined pressure limit.

In certain known discharge valves, the fluid pressure is applied to as to raise from its seat a valve member by acting against an opposing spring. In the absence of pressure, the spring maintains the said member very strongly against its seat. This permanent contact ensures conservation of the surfaces. Moreover, the spring is always compressed and it happens frequently that the pressure limit or calibration of the valve varies according to the shelf life. Indeed when the fluid pressure is lower than this calibration the force of application of the valve member on its seat varies inversely to the fluid pressure such that if the calibration is not precise the opening of the valve is very progressive.

In other known valves, the valve member is urged to its seat by a reserve of compressed gas. There again the contiguous surfaces are constantly compressed, and one cannot control the valve of calibration which necessitates storage of a large number of valves of different kinds.

The present invention has for its object the avoiding of these inconveniences by providing a valve in which the forces applied to the contacting surfaces at the edge of the seat remain practically nil when the fluid circuit is not under pressure. This valve has moreover a more precise calibration value which is controllable.

A discharge valve according to the invention comprises a body in which a first fluid-tight chamber is adapted to be put into communication with a pressurised fluid circuit while a second chamber is provided with at least one orifice permitting fluid to escape freely, and a valve member adapted to rest on a seat to separate these chambers or to place them in mutual communication, the valve being characterised in that the valve member is urged against its seat on the first chamber side, the seat being disposed on a slidable barrel disposed adjacent a spring so that in the absence of pressure in the first chamber the spring has practically no effect, and an abutment fixed to the body being provided so as to contact the valve body when the latter is on its seat and slides with the barrel, an increase of fluid pressure in the first chamber producing the following effects:

- if the pressure remains lower than the calibration value of the valve, the valve member is applied against the seat by the fluid with a force proportional to this pressure when the barrel slides and compresses the spring,
- if the pressure is above the calibration value of the valve, the valve member contacts the abutment when the barrel slides by compressing the spring so that the seat is spaced from the valve member.

According to a supplementary characteristic of the invention, the body of the valve comprises a central bore, whereof one end is closed by a cap having an integral coaxial stem which slides in the central bore of a cylinder laterally extending the barrel carrying the seat, the cap being provided with an axial through hole to permit placing in communication the pressurised fluid circuit and the first chamber delimited in the interior of the cylinder by the end of the stem, a seal being provided between the cylindrical surface of the stem and the cylinder bore.

According to a supplementary characteristic of the invention the first chamber encloses a small helical spring constantly compressed between the valve member and the end of the stem to urge the valve member in the direction of its seat, this small spring being much less powerful than the barrel return spring.

According to a supplementary characteristic of the invention the valve membe is constituted by a ball and the seat is constituted by a truncated bore.

According to a modification, the valve member is constituted by a truncated finger and the seat is constituted by the orifice of a hole in the barrel.

According to another modification, the valve member has at its end a plane annular surface adapted to abut against the face of a circular boss constituting the seat.

According to a supplementary characteristic of the invention the second chamber is constituted by the remaining free volume of the central bore of the valve body beyond the barrel on which the seat is located.

According to a supplementary characteristic of the invention the return spring of the barrel is constituted by a helical spring, whereof one end abuts a shoulder of the body, at the end of the central bore, and whereof the other end abuts the slidable barrel.

According to a supplementary characteristic of the invention, the other end of the central bore of the valve body is also closed by a cap in the center of which is fixed a rod extending axially into the bore and adapted to engage with substantial play inside the seat on the sliding barrel, and whereof the free end constitutes an abutment for the valve member. This abutment can be plane, round, sharp, or any appropriate form to suit the type of valve member.

According to a supplementary characteristic of the invention, this rod is screw engaged in a bore of the cap, and it can be used to control the calibration value of the valve by being screwed in one direction or the other, which varies the longitudinal position of its free end.

BRIEF DESCRIPTION OF THE DRAWINGS

The present invention will now be described by way of example with reference to the accompanying drawings, in which.

DESCRIPTION OF THE PREFERRED EMBODIMENT

Figure 1:
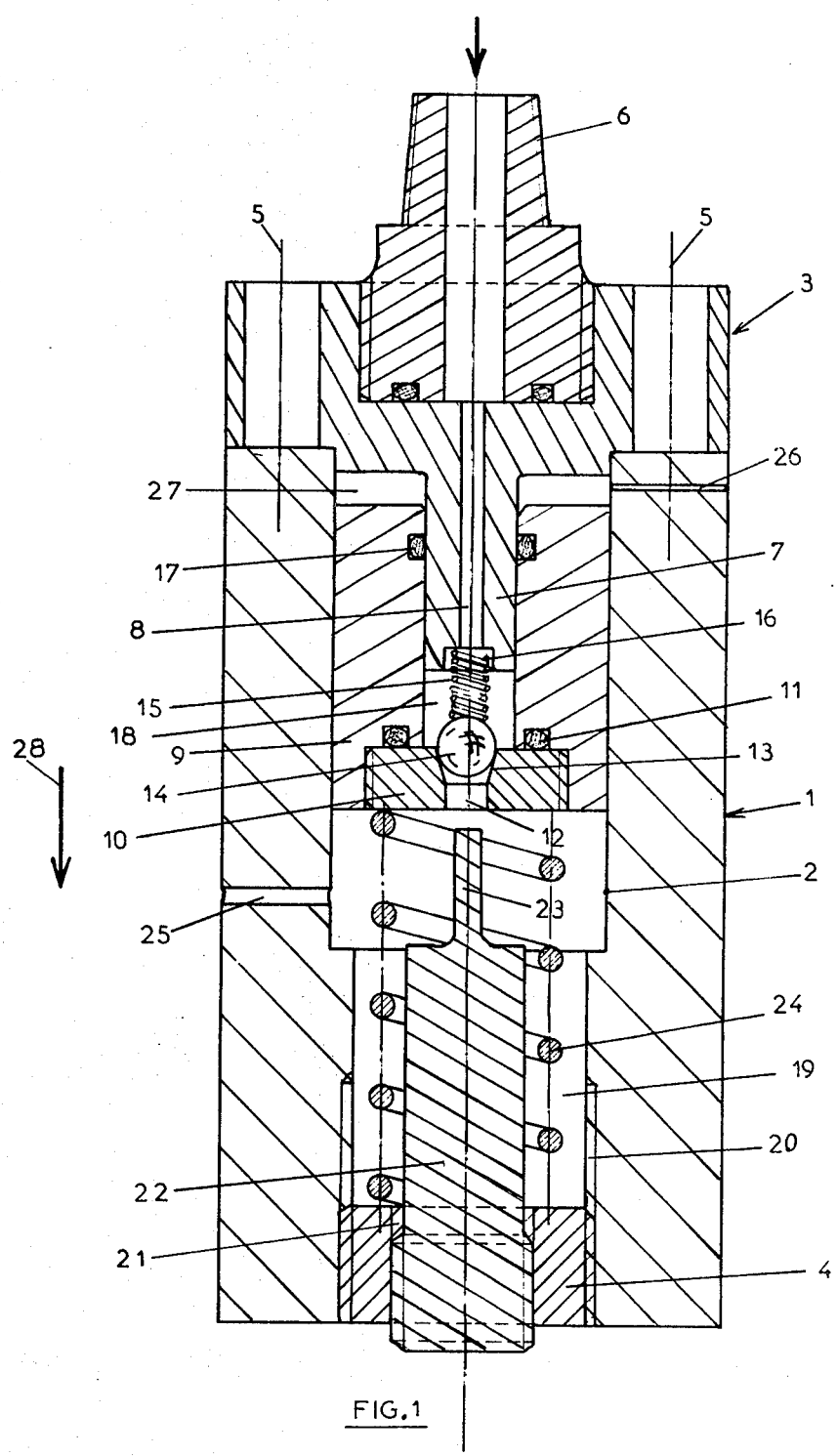
FIG. 1 is a sectional view of a valve according to the invention.

As shown in FIG. 1, the valve according to the invention comprises a housing or valve body 1 with a central cylindrical bore 2 sealed at both ends by caps 3 and 4.

The cap 3 is fixed to the body 1 by means of screws 5 and it is attached to a screw-threaded nozzle 6 enabling the valve to be connected into a hydraulic circuit in a known manner. The cap 3 is integral with a coaxial stem 7 which extends into the bore 2 and which itself has an axial bore 8.

A barrel or piston member 9 with an axial bore therethrough slides freely in the bore 2 and one of the ends of the barrel is recessed to accommodate a disc 10. A sealing ring 11 is compressed between the barrel 9 and the disc 10. The disc 10 has an axial frusto-conical bore 12 therethrough which widens towards the interior of the barrel 9 and which forms the valve seat the reference character "13". The closure member of the valve is a ball 14. A small helical spring 15 is compressed between the ball 14 and a shoulder 16 provided around the opening of the bore 8 in the free end of the stem 7. The barrel 9 can slide freely over the stem 7 and an annular sealing ring 17 is compressed in an annular groove in the inner surface of the barrel 9 to ensure the sealing of a first chamber 18 of the valve, defined within the barrel 9 by the free end of the stem 7.

A second chamber 19 of the valve is defined within the bore 2 between the barrel 9 and the disc 10 on the one hand, and the cap 4 on the other hand. The cap 4 is screwed into a screw-threaded bore 20 of the body 1 and this cap 4 itself has a screw-threaded axial bore 21 in which is screwed a rod 22. The end 23 of the rod 22 is tapered to enable it to penetrate substantially within the bore 12 as the barrel 9 slides inside the bore 2.

A helical spring 24 is positioned in the chamber 19, one of its ends abutting the cap 4 and the other end abutting the disc 10. This spring 24 surrounds the rod 22.

The body 1 has two radial bores or outlet passages 25 and 26 which connect the bore 2 to the exterior of the valve.

Operation

In use, when scarcely any fluid pressure is exerted within the bore 8 and consequently the chamber 18, the valve is in the state shown in FIG. 1. Only the spring 15 holds the ball 14 on the seat 13 in opposition to the weight of the ball to prevent the ball 14 being displaced when the valve is orientated in various positions in any particular circuit. As shown in FIG. 1, the spring 24 is relaxed and under either no pressure or under very slight compression from the spring 15 acting via the intermediary of the barrel 9.

When the fluid pressure within the bore 8 and the chamber 18 rises, the fluid cannot escape from the chamber 18 and an axial force is produced acting on the disc 10 to force the barrel 9 in a direction 28 and, compress the spring 24 proportionate to the barrel's displacement. Simultaneously, the fluid pressure forces the ball 14 against the seat 13, sealing it.

Figure 2:
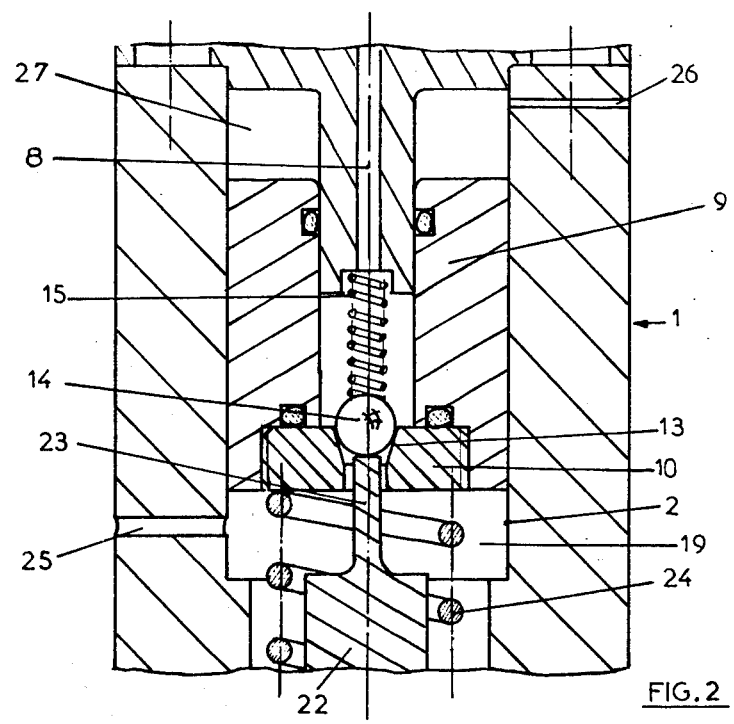
FIGS. 2 and 3 are views of parts of FIG. 1 shown on an enlarged scale.
Figure 3:
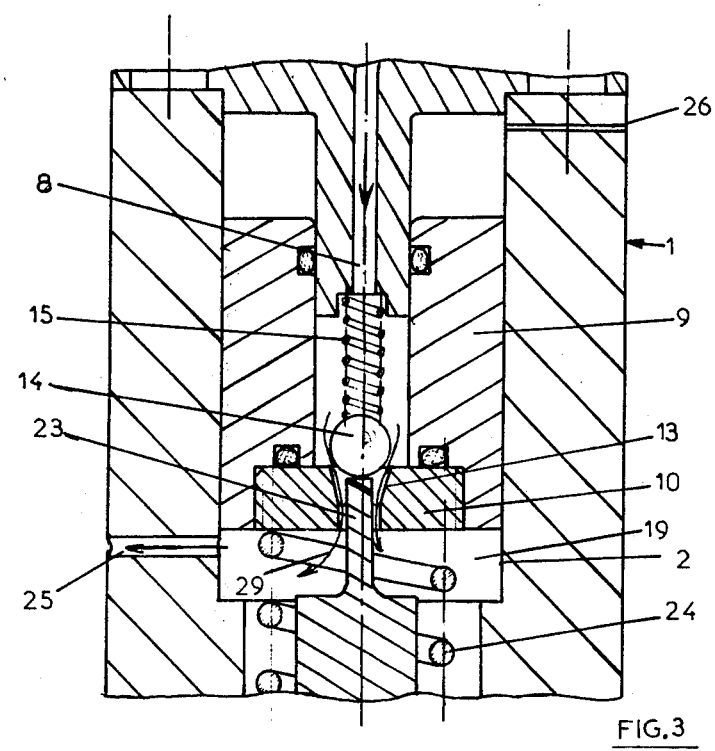

When the fluid pressure reaches a predetermined value, according to the adjustment of the valve, the barrel 9 compresses the spring 24 sufficiently for the end of the rod 22 to contact the ball 14 (see FIG. 2). As the pressure rises above the predetermined value, the barrel 9 compresses the spring 24 further so that the end 23 of the rod 22 removes the ball 14 from its seat 13 (see FIG. 3). The fluid can then flow in a direction 29 from the chamber 18 into the chamber 19, where it escapes from the valve via the bore 25. The bore 25 can be connected to pipe-work to collect the fluid.

When the fluid pressure falls, the barrel 9 returns to its initial position under the action of the spring 24. The bore 26 maintains a third chamber 27 formed between the barrel 9 and the cap 3 at atmospheric pressure so that the sliding of the barrel is not inhibited.

To regulate the calibration of the valve, it is sufficient to screw the cap 4 and the rod 22 further into or out of the body 1.

Figure 6:
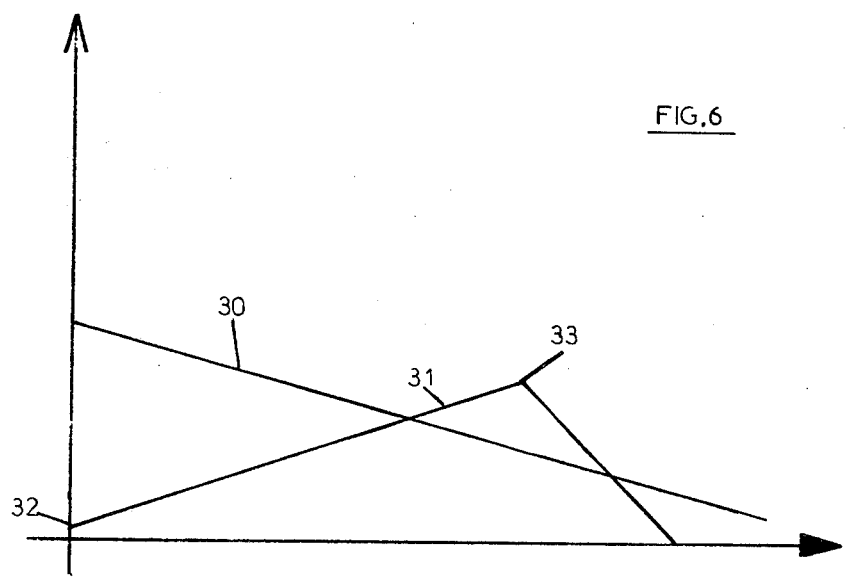
FIG. 6 is a diagram in the form of a graph showing the functioning of the valve.

The graph shown in FIG. 6 plots along the abscissa the pressure of the fluid and along the ordinate the force exerted on the seat of the discharge-valve by the fluid pressure.

The line 30 corresponds to the plot for a known type of valve in which the fluid pressure moves a valve member progressively from its seat in opposition to a spring. It can be seen that the force is inversely proportional to the pressure. This results in a poor sealing of the valve even when the pressure is well below the pre-determined adjustment value of the valve. Also, the greatest force is exerted in the absence of pressure, when sealing of the valve is unnecessary. This force is exerted in a fashion injurous to the surfaces of the contacting members of the valve.

The curve 31 corresponds to the plot for a valve according to the present invention. In the absence of fluid pressure, at point 32, the force exerted is very weak being that exerted by the spring 15. As the pressure increases, the force increases proportionally up to a point 33 corresponding to the pre-determined adjustment value of the valve at which the ball just touches the end 23 of the rod 22. When the pressure increases beyond this value, the force becomes inversely proportional to the pressure but the gradient of the curve is a function of the sections defined between the chamber 18 and the contact circle of the ball 14. More importantly, when compared to a valve giving a plotted line 30, the opening of the present valve occurs at a more precisely defined moment.

Figure 4:
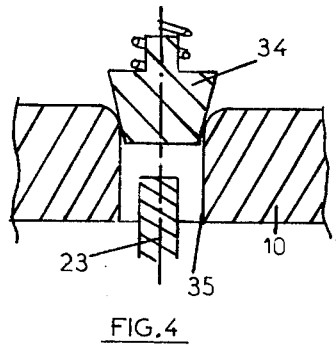
FIG. 4 is a sectional view showing a modification to an enlarged scale of part of the valve shown in FIG. 1.

FIG. 4 shows a modification of the invention. The ball 14 can be replaced by a frusto-conical finger or projection 34 so that the valve seat can comprise simply the opening of a bore 35 in the disc 10. In this modification, as when using a ball, the presence of a conical contact surface is advantageous because the seat is self-cleaning, particles in suspension in the fluid tending to be automatically eliminated during successive openings and closings of the valve.

Figure 5:
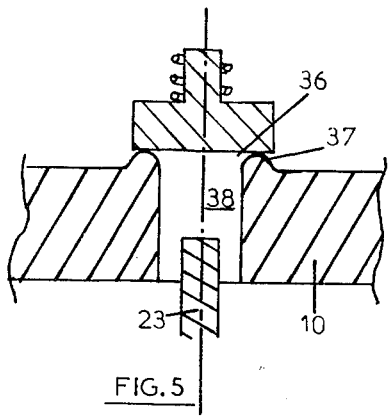
FIG. 5 is another sectional view showing a further modification to an enlarged scale of part of the valve shown in FIG. 1.

FIG. 5 shows a further modification of the invention. Here, the ball 14 is replaced by a disc whose end surface abuts against a seat comprising an annular projection surrounding the opening of a bore 38 in the disc 10. This modification enables a more rapid opening of the valve to be obtained.

While the preferred embodiment of the invention has been disclosed, it will be apparent to those skilled in the art that changes may be made to the invention as set forth in the independent claims, and, in some instances, certain features of the invention may be used to advantage without corresponding use of other features. Accordingly, it is intended that the illustrated and descriptive materials herein be used to illustrate the principles of the invention and not to limit the scope thereof.

What is claimed is:

1. A fluid discharge valve comprising:
a body member having an annular central passage opening to one end of said body member;
a cap member sealingly mounted to said one end of said body member, said cap member comprising:
an annular stem portion extending into said annular central passage, and having an inlet passage means;
means for mounting said cap member to said housing;

a pressure responsive piston member moveably mounted in said central passage of the body member, said piston member having an annular bore coaxially and sealingly receiving said annular stem portion of said cap member, said piston and cap members cooperating to define in said central passage first, second and third pressure chambers, said first pressure chamber communicating with said inlet passage means of the cap member;

said body member further having a first and second outlet passage communicating respectively with said second and third pressure chambers;

said piston member further having passage means communicating said first and second pressure chambers; one end of said passage means of said piston member terminating in a valve seat;

a valve member disposed in said passage means of the piston member and communicating with said valve seat, said valve member cooperating with said valve seat for normally closing communication between said first and second pressure chambers;

first means for biasing said valve member interposed said valve member and said stem portion of the cap member, said biasing means being operative only during communication between said first and second pressure chambers, said first biasing means further being substantially relaxed and positioned only to hold said valve member against said valve seat in opposition to the weight of said valve member so that said valve member will not be displaced from said valve seat when said fluid discharge valve is oriented in various positions while said first and second chambers are not communicating;

a rod member mounted in said central passage adjacent said piston member, said rod member having a first portion extending into said second pressure chamber of the body member, said extending first portion being adjustable in space relationship to said valve member;

second means for biasing interposed said piston member and said rod member, said second biasing means being substantially relaxed in the absence of a pressure differential between said first and second pressure chambers, said second biasing means further opposing movement of said piston member in one direction for a predetermined distance; and means for positioning said first portion of said rod member in space relationship to said valve member, whereby when a pressure in said first pressure chamber moves said piston member in one direction and said pressure reaches a predetermined value, the rod member lifts said valve member from said valve seat thereby opposing said first biasing means for establishing communications between said first and second pressure chambers.

* * * * *

UNITED STATES PATENT AND TRADEMARK OFFICE
CERTIFICATE OF CORRECTION

PATENT NO. : 4,137,341
DATED : February 6, 1979
INVENTOR(S) : Andre Gonin

It is certified that error appears in the above-identified patent and that said Letters Patent are hereby corrected as shown below:

Column 1, line 12, delete "to" first occurrence and insert ----so----.

Column 2, line 12, delete "membe" and insert ----member----.

Column 3, line 10, delete "the refer-"

Column 3, line 11, delete "ence character "13" and insert ----13----.

Signed and Sealed this

Twenty-second Day of May 1979

[SEAL]

Attest:

RUTH C. MASON
Attesting Officer

DONALD W. BANNER
Commissioner of Patents and Trademarks